(12) United States Patent
Ochs et al.

(10) Patent No.: US 10,875,238 B2
(45) Date of Patent: Dec. 29, 2020

(54) PATTERNED LAYER DEPOSITION

(71) Applicant: Hewlett-Packard Development Company, L.P., Houston, TX (US)

(72) Inventors: David H. Ochs, Corvallis, OR (US); Joshua M. Yu, Corvallis, OR (US); Jeffrey A. Nielsen, Corvallis, OR (US); Kenneth Ward, Corvallis, OR (US); Christie Dudenhoefer, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 305 days.

(21) Appl. No.: 15/748,846

(22) PCT Filed: Oct. 20, 2015

(86) PCT No.: PCT/US2015/056406
§ 371 (c)(1),
(2) Date: Jan. 30, 2018

(87) PCT Pub. No.: WO2017/069738
PCT Pub. Date: Apr. 27, 2017

(65) Prior Publication Data
US 2018/0222109 A1 Aug. 9, 2018

(51) Int. Cl.
*B29C 64/40* (2017.01)
*B29C 64/112* (2017.01)
*B33Y 30/00* (2015.01)
*B33Y 50/02* (2015.01)
*B33Y 10/00* (2015.01)
(Continued)

(52) U.S. Cl.
CPC .......... *B29C 64/112* (2017.08); *B29C 64/188* (2017.08); *B29C 64/245* (2017.08); *B29C 64/40* (2017.08); *B33Y 10/00* (2014.12); *B33Y 30/00* (2014.12); *B33Y 50/02* (2014.12)

(58) Field of Classification Search
CPC ... B29C 64/112; B29C 64/188; B29C 64/386; B29C 64/40; B33Y 10/00; B33Y 30/00; B33Y 50/02
USPC ........................................................ 264/401
See application file for complete search history.

(56) References Cited

U.S. PATENT DOCUMENTS 7,595,083 B2   9/2009   Jung et al.
8,197,899 B2   6/2012   Chou et al.
8,480,933 B2   7/2013   Truskett et al.
(Continued)

FOREIGN PATENT DOCUMENTS

CN   102549732        7/2012
KR   20110074582      6/2011
WO   WO-2013062580 A1 5/2013

OTHER PUBLICATIONS

Partridge, R. et al., "In-lab Three-dimensional printing," published on Jun. 21, 2012, retrieved from the internet [http://www.ncbi.nlm.nih.gov/pmc/articles/PMC3399707/pdf/org-8-22.pdf], 6 pages.
(Continued)

*Primary Examiner* — Jeffrey M Wollschlager
*Assistant Examiner* — Xue H Liu
(74) *Attorney, Agent, or Firm* — Fabian VanCott

(57) ABSTRACT

Systems, methods, and computer readable medium to provide patterned layer deposition of liquid types to a plate surface in layers organized in layouts with sites of patterns aligned to a plate origin of the plate surface. At least one layer includes a layout defining a geometric layout of the plate surface.

18 Claims, 10 Drawing Sheets

(51) Int. Cl.
    *B29C 64/245*    (2017.01)
    *B29C 64/188*    (2017.01)

(56) References Cited

U.S. PATENT DOCUMENTS

| | | |
|---|---|---|
| 2004/0145629 A1 | 7/2004 | Silverbrook |
| 2008/0070304 A1 | 3/2008 | Forgacs et al. |
| 2010/0098848 A1 | 4/2010 | Truskett |
| 2012/0215481 A1 | 8/2012 | Covey et al. |
| 2013/0172985 A1 | 7/2013 | Prestwich et al. |
| 2014/0113373 A1 | 4/2014 | Chien et al. |
| 2015/0119994 A1 | 4/2015 | Kang et al. |
| 2015/0171368 A1 | 6/2015 | Vronsky et al. |

OTHER PUBLICATIONS

International Searching Authority, "Search Report," issued in connection with PCT patent application No. PCT/US2015/056406, dated May 13, 2016, 5 pages.

International Searching Authority, "Written Opinion," issued in connection with PCT patent application No. PCT/US2015/056406, dated May 13, 2016, 5 pages.

Roland Partridge, Noel Conlisk, and Jamie A. Davies, "In-lab three-dimensional printing an inexpensive tool for experimentation and visualization for the field of organogenesis," Organogenesis vol. 8 Issue, retrieved from the internet [www.landesbioscience.com], pp. 22-27.

PATTERNED LAYER DEPOSITION

BACKGROUND

Various productivity tools have been developed to dispense multiple fluidic substances or liquid compounds onto a plate surface to create three-dimensional (3D) structures, organs, skin grafts, titrations, assays, or other physical products and/or perform chemical and biological analyses. A plate surface may include a flat surface, a well plate with a geometry of wells, a non-media (i.e. non-paper) substrate having cavities, a media substrate (e.g. paper having discrete positions), a sample repository grid, etc. Even with current productivity tools, high-throughput research and development teams wish to test and bring products to market even faster.

BRIEF DESCRIPTION OF THE DRAWINGS

The disclosure is better understood with reference to the following drawings. The elements of the drawings are not necessarily to scale relative to each other. Rather, emphasis has instead been placed upon clearly illustrating the claimed subject matter. Furthermore, like reference numerals designate corresponding similar parts through the several views.

DETAILED DESCRIPTION

A patterned layer dispensing system is disclosed herein that permits dispensing, based on predefined protocols, fluidic substances in specially designed precise patterns aligned at various sites in multiple ordered layers to allow for a simple yet flexible way to define non-trivial dispersive geometries not previously possible. Further, the disclosed method allows for the creation of multiple unique 3D material structures as well as execution of pharmaceutical and biological experiments. Accordingly, the computer implemented method, systems, and software program product described herein permits various layouts of a plate surface with multiple aligned sites to match common pre-existing surfaces, such as microplates, as well as to allow creation of new custom dispense surfaces for improved experimental testing and/or creation of 3D structures, pharmaceuticals, titrations, assays, or other experimental and production results. With this patterned layer deposition system, multiple liquid compounds may be applied on a plate surface in the confines of aligned patterns in ordered layers, rather than traditionally done at a single location or spread evenly over a region on the plate surface.

Figure 1:
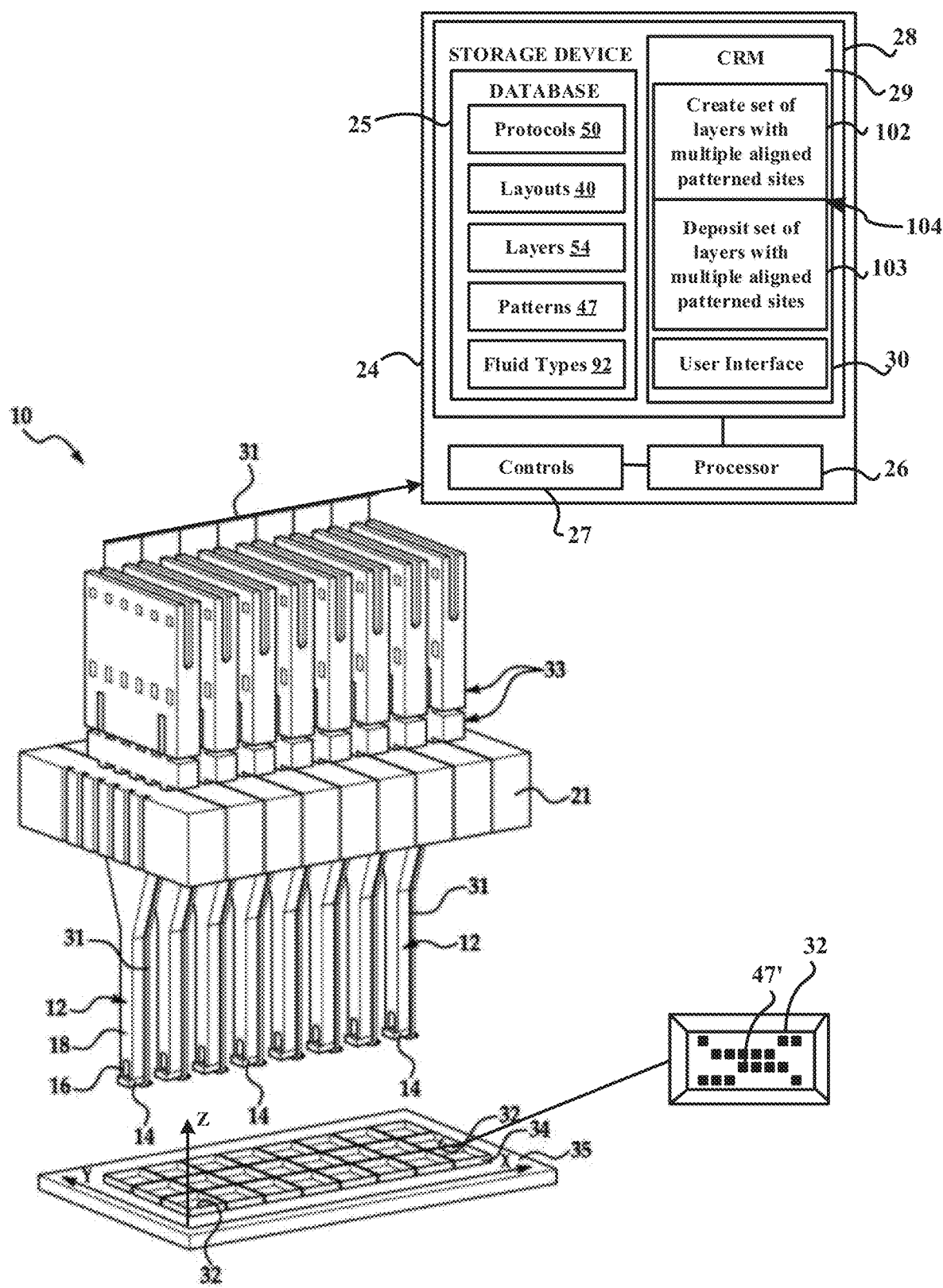
FIG. 1 illustrates some of the components of an example of a patterned layer dispensing system.

FIG. 1 illustrates some of the components of an example patterned layer dispensing system 10. The patterned layer dispensing system 10 includes a set of individual dispensers 12 that are conjoined and aligned in a substantially linear, parallel fashion. In other examples the individual dispensers 12 may be aligned as an array. The dispensers 12 may be analog dispensers that modulate the delivered volume via a variable or time-gated pressure, displacement, nozzle restriction, valve opening, or fluid attraction/repulsion/deflection. The dispensers 12 may also be digital dispensers that are capable of delivering variable quantities of fluid types 92 in multiple layers 54 as a patterned multitude of small like-sized droplets that are dispensed onto a plate surface 34 at specified locations.

To help ease understanding, clarity, and conciseness, the following definitions may be used for discussion of additional details of the patterned layer dispensing system discussed herein unless context requires otherwise or the term is defined explicitly different. The following definitions are not meant to be a complete definition of the respective terms but rather is intended to help the reader in understanding the following discussion.

Protocol—A collection of fluids and dispense information organized in the protocol 50 as a set of layers 54 for each layer 54 to be deposited in the set and is sometimes referred to as a 'run'.

Plate Surface—Sometimes plate surface 34 is just referred to as a "plate" and is a dispense region of at least two dimensions for receiving fluids from a patterned layer dispensing system. In some examples, it may be defined as a well plate with a geometry of well sites on the well plate. In other examples it can be any geometrically defined region of sites addressable by the dispensing mechanism of a patterned layer dispensing system. It may be a flat surface or a three-dimensional (3D) surface with varying depths.

Fluid Types—Liquid dispensed compounds which are generally aqueous ($H_2O$) or DMSO (Dimethyl sulfoxide) based fluids; however, other solvents are possible depending on the application. The fluid types 92 may contain chemical or biologic fluids suitable for titration or assays and other experiments. Fluid types 92 may also include inks, pigments, pH indicators, buffers, cell tissues, genetic material, suspended micro or nano-particles, etc. in an experimental or production run. For instance, in some examples the fluid types 92 may include candidate drug compounds in DMSO, aqueous cell lycates, extracted or amplified DNA, blood components, and the like, or combinations thereof.

Site—A location on the plate surface where fluid type 92 may be dispensed. For a plate surface that describes a well plate with a geometry of well sites, the sites 32 may be the location and shapes of the specific wells geometry. However, the sites 32 may also be defined to be a larger, smaller, or different shape than the specific well geometric shapes depending upon the application. For instance, the well site may be rectangular and the site 32 may be defined as a circle or narrow bar within or outside of the rectangular dimensions of the specific well.

Layout—A description of various sites arranged within a defined plate surface. Layouts 40 may be shared between all protocols 50 and may be stored separately from the protocols 50. Sites 32 may be added to a layout 40 individually or as a grid of sites 32. Sites 32 may be anchored with respect to a layout or plate origin 44 of the plate surface 34 at the center point of the site 32 or from a corner of the site 32. Each layout 40 has the sites or site grids defined from a horizontal and vertical offset from the layout or plate origin 44. If the sites 32 are arranged in a grid, the sites 32 may be referred to using row and column counts. The layout 40 also includes horizontal and vertical spacing for site grids. In some examples, the site or site grids may contain multiple labels, such as for use in selection with a graphical user interface (GUI) or identification of sites 32.

Pattern—A binary bit-map, such as a grid of dots or spots. A pattern 47 (an example pattern 47' is shown as one example in FIG. 1 at one site 32) may be shared between all protocols 50 and may be stored separately from the protocols 50 and layers 54. Patterns 47 may be defined to have a specific size such as by rows and columns. A pattern 47 may be defined by the horizontal and vertical dot spacing but that spacing in some examples may be confined based on the geometry of the dispensing components. Patterns 47 may be created and edited in a GUI or other interface or may be imported or otherwise received from other creation and editing sources. For instance, a pattern 47 may be imported from a GIF, TIFF, or JPEG file, as just some examples. In many instances, the pattern 47 may be a set of dots, lines, rectangles, circles, ellipses, or other geometric shapes. In some instances, however, the pattern 47 may be a more complex shape or figure.

Layer—A fluid type 92 dispensed as a set of patterns 47 at sites. Layers 54 may be dispensed in a strict bottom to top order in some examples and in other examples may be placed randomly or based on an algorithm. Layers 54 are added to protocols 50 to create a "run." When a layer 54 is added to a protocol 50, a single fluid may be specified for the layer 54. However, the same fluid type 92 may be defined for multiple layers 54. Unused sites 32 may be selected from the layout 40 to apply a single pattern 47. The sites may be selected in a GUI interface directly or by label. Patterns 47 may be located on the site 32 by center or a corner depending on site definitions. If a pattern 47 is larger than the site geometry, it may overlap patterns 47 at other sites 32. The layer 54 also specifies the fluid volume to be dispensed. In some instances, the sites 32 are identical with a consistent fluid density (per dot). In other instances, the sites 32 are identical but there is a gradient fluid density across the pattern 47. In yet other instances, a gradient fluid density is applied across the sites 32, each site 32 having a consistent fluid density within the site.

Gradient—A change in fluid density based on location. For patterns 47 with a gradient fluid density, the gradients may be applied vertically or horizontally across the pattern 47 and may be a continuous or a staircase function from site to site. The beginning and ending densities may be specified in the GUI interface for each end of the gradient in a similar manner to selecting consistent densities for the site 32. When the gradient is applied across a group of sites 32, each site 32 may have a single fluid density such as with the staircase function between sites. However, replicate fluid densities are possible.

The terms "first", "second", "third", etc. may be used herein to distinguish one component (e.g., one row) from another component (e.g., another row). Note that these terms may be utilized to facilitate understanding, but are not meant to impose any particular order on the components being described.

Referring back to FIG. 1, the patterned layer dispensing system 10 may include any number of dispensers 12. In an example, the number of dispensers 12 is 8. In other examples, the number of dispensers 12 may correspond to a standard number of discrete sites 32 in a row, column, or area of a standard plate surface 34. Standard numbers of discrete sites 32 may include, for example, 4, 6, 8, 12, 16, 24, 32, 48, 64, 96, 384, and 1536. Examples of suitable dispensers 12 include jet dispensers (e.g., thermal jet dispensers, piezo jet dispensers, piezo-capillary jet dispensers), acoustic dispensers (e.g., acoustic dispensers by EDC™ and Labcyte™), syringe-based dispensers, and tips or pipettes for aspirate-and-dispense functions (e.g., GILSON™ tips and pipettes, Hamilton pipettes, Mosquito pipettes, etc.).

The various dispensers 12 of the patterned layer dispensing system 10 may be conjoined. As used herein, the term "conjoined" means that the dispensers 12 are coupled together in some manner so that they can be moved as a single entity. In an example, the dispensers 12 may be conjoined by assembling the dispenser components together (e.g., a multi-channel autopipettor). As an example, the dispensers 12 themselves are discrete, separate entities (e.g., as shown in FIG. 1) that are assembled together using a carriage 21. In another example, the dispensers 12' (FIG. 2) may be formed as a monolithic device (e.g., a jetting chip with parallel fluid channels and associated nozzles or an array of fluid channels and associated nozzles formed therein). In still another example, the dispensers 12 may be partially monolithic and partially assembled (e.g., multiple fluid channels and nozzles may be monolithically formed in a die and may have an attached fluid channel extender(s) to increase the dimensions of the fluid channels). Such a partially monolithic and partially assembled device is shown in FIG. 3. Note that the monolithically integrated multi-channel dispensers (FIG. 2) or the partially monolithic and partially assembled multi-channel dispensers (FIG. 3) may be also assembled as an array in some examples.

In the example shown in FIG. 1, each dispenser 12 includes a die 14. An example of the die 14 is a chip having microelectromechanical system (MEMS) structures embedded thereon and/or therein. The die 14 may define, or may be in fluid communication with a fluid channel 16 that receives the desirable fluid/substance to be dispensed from the dispenser 12. The die 14 is also attached to a fluid channel extender 18 that has multiple slots formed therein that can receive fluid from a fluid source. Other examples of the fluid channel extender 18 do not have slots formed therein. The interior of the fluid channel extender 18 is in fluid communication with the fluid channel 16 and actually expands the dimensions of the fluid channel 16. Fluid is delivered from the channel 16 to nozzles 20 (FIG. 2, not shown in FIG. 1) via capillary action or some other fluid priming action.

Figure 2:
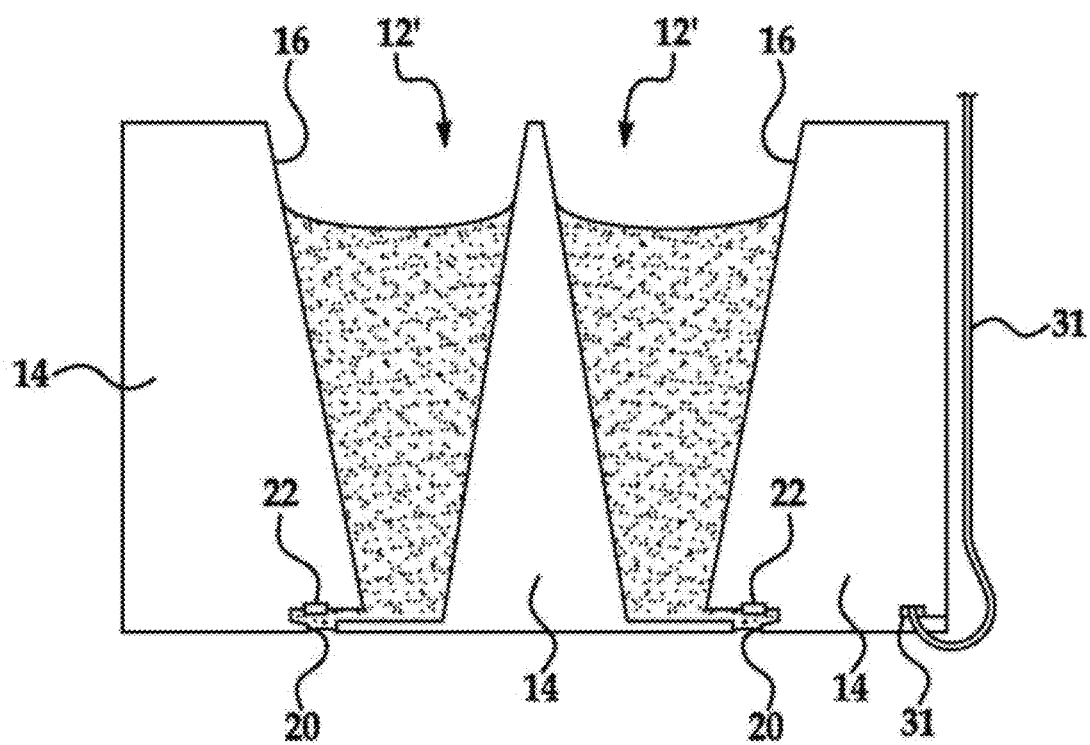
FIG. 2 is an example of monolithically integrated dispensers.
Figure 3:
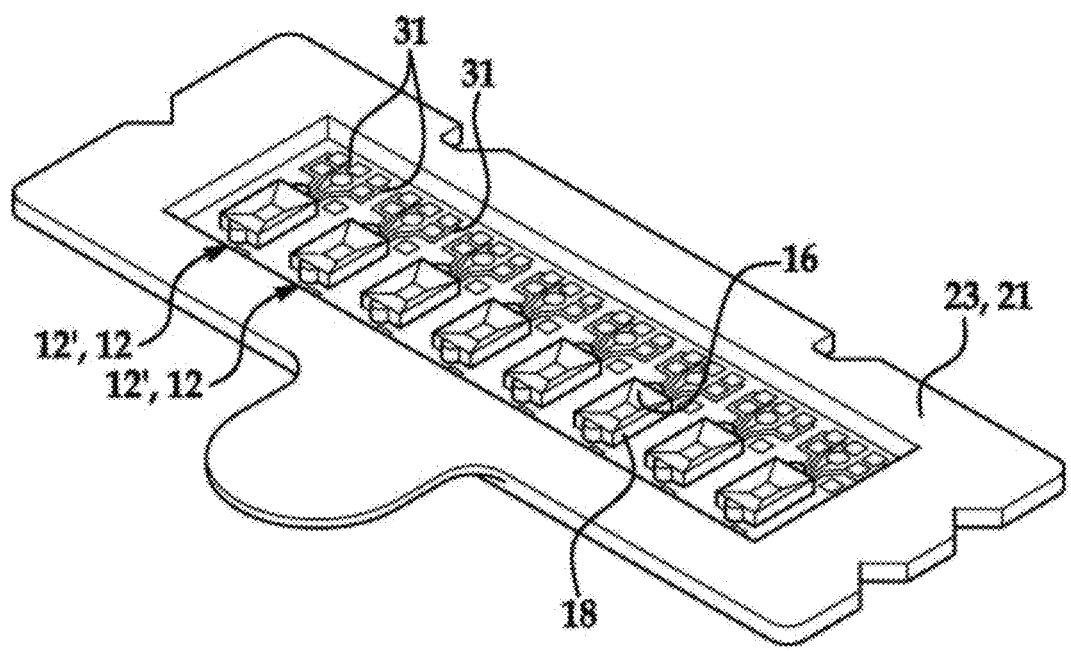
FIG. 3 is an example cassette or carriage with eight dispensers.

Another example of the die 14 is shown in FIG. 2. More particularly, FIG. 2 illustrates monolithically integrated dispensers 12' including a single die 14, which may be made up of multiple layers 54. The single die 14 has multiple fluid channels 16 formed therein, each of which corresponds to one of the dispensers 12'. Each fluid channel 16 is also associated with its own nozzle(s) 20. In the examples disclosed herein (e.g., FIGS. 1-3), the nozzle(s) 20 is/are defined in the die 14 and is/are in fluid communication with the fluid channel 16 for dispensing the fluid/substance. Note that when the dispenser 12 or monolithically integrated dispensers 12' do not include a die 14 (e.g., a tip, a pipette, etc.), the nozzle(s) may be formed in the housing that defines the fluid channel 16. The number of nozzles may vary depending upon the dispenser 12 or dispensers 12'. Some dispensers 12 or 12' are single-nozzle dispensers and other dispensers 12 or 12' are multi-nozzle dispensers. For example, a syringe or plastic tip dispenser may have a single nozzle. For another example, a jet dispenser may have anywhere from 1 nozzle to 100 nozzles per fluid channel 16. An example of a multi-nozzle dispenser 12, 12' has 22 nozzles per fluid channel 16.

In the examples shown in FIGS. 1-3, fluid may be introduced into the fluid channels 16 via another fluid dispenser (e.g., a pipette), a fluid source (e.g., where fluid is drawn into the channel 16), or a reservoir (e.g., which delivers the fluid/substance on command to the fluid channel (s) 16 in response to signals from a processor 26.

The dispensing fluid channels 16 may be used to add volumes of different research drugs as doses, for example, to be tested in a bioassay. The dispensing fluid channels 16 may also be used to dispense the same fluid from all channels in parallel, which expedites dispensing. The fluid channels 16 may be aligned in a straight line and have coordinated motion and coordinated dispense actuation, while also being fluidically separated from one another to achieve separate fluid dispensing.

The volume of fluid that may be dispensed may be very small/minute. As defined herein, the terms "very small volume" and "minute volume" both refer to a volume ranging from about 10 femtoliters (fL) or a fraction thereof to about 10 microliters (μL) of fluid, and in some examples, up to about 50 μL of fluid. In an example, pipette tips are used to dispense a volume ranging from 0.05 μL to about 50 μL. In another example, the individual dispensed volume range from 1 picoliter (pL) to 5 μL, and these relatively large volumes are made up of numerous picoliter droplets. In still another example, the individual volume of dispensed drops ranges from about 1 pL to about 300 pL. In yet other examples, a dispensed volume may range from about 1 pL to about 100 pL and by injecting 1000 drops from 10 nozzles, a fluid volume ranging from about 10 nanoliters (nL) to about 1 μL may be dispensed. More drops and nozzles can of course be used to dispense even more volumes of fluid.

As shown in FIG. 2, each of the monolithically integrated dispensers 12' includes an actuator 22 associated with the fluid channel 16. In the example shown in FIG. 1, Note that each individual dispenser 12 may, in some examples, have a die 14 with an actuator 22 operatively positioned therein. In any of the examples disclosed herein, the actuator 22 may be aligned with multiple nozzles 20 so that when actuated, droplets of a predetermined volume may be dispensed from the fluid channel 16 of the dispenser 12 or the monolithically integrated dispensers 12'. The actuator 22 of a pipette or tip type dispenser may be an electrically actuated fluid displacement mechanism that forces the substance/fluid out of the nozzle(s) 20.

FIG. 3 depicts a cassette 23 (or alternatively referred to as a carriage 21) with eight dispensers 12, 12' that each include a die 14 (positioned beneath the cassette 23 and thus not shown) with attached fluid extenders 18 and attached addressing circuitry 31 (electrical leads and electrical contact pads). In this example, each die 14 may be part of a separate dispenser 12 (e.g., similar to the dies 14 shown in FIG. 1), or a single die 14 may define multiple fluid channels 16 and monolithically integrated dispensers 12'.

Referring back to FIG. 1 and also referencing FIGS. 2 and 3, the monolithically integrated dispensers 12' of FIG. 2 and the dispensers 12 or 12' that are part of the cassette 23 of FIG. 3 are operatively connected to addressing circuitry 31 (e.g., electrical pins, bond pads, traces, etc.) that is designed to also operatively connect to a processor 26 of a control interface 24 that is used to control addressing and dispensing. As such, the examples of FIGS. 2 and 3 may be integrated into a patterned layer dispensing system 10. In the examples shown in both FIGS. 2 and 3, the addressing circuitry 31 is configured so that each dispenser 12', 12 is individually addressable by a processor 26.

Each of the dispensers 12 (or the monolithically integrated dispensers 12') may be connected to a control interface 24, which includes at least a processor 26, a storage device 28 with a database 25 and computer readable medium (CRM) 29 that includes instructions 104 and a user interface 30. Note that the dispensers 12, 12' may be permanently attached or removably attached to the processor 26 (e.g., the cassette 23 and its dispensers 12 are removably attached). The processor 26 may include a hardware architecture for retrieving executable code (i.e., computer readable instructions 104) from the data storage device 28 and executing the executable code. The executable code may, when executed by the processor 26, cause the processor 26 to implement or operate at least the functionality of selecting some or all of the dispensers 12, 12' according to a protocol 50 that includes a set of layers 54 with layout 40 of aligned sites having patterns 47 to define non-trivial dispense geometries. For instance, the instructions 104 may include deposition instructions 103 that when executed by the processor 26 to operate the fluid dispensers 12 via controls 27 to deposit a set of layers 54 with multiple aligned sites 32 on the plate surface 34. In the course of executing code, the processor 26 may receive input from and provide output to a number of other hardware units (e.g., a graphical or other user interface 30). For instance, the instructions 104 may include editor instructions 102 that when executed by the processor 26 causes the processor 26 to provide a GUI user interface 30 to allow a user to create and/or receive a set of layers 54 with multiple aligned sites 32. The processor 26 may also deliver actuation power to the selected dispensers 12, 12' and may cause the desired volumes specified in a designated protocol 50 to be dispensed.

The data storage device 28 may store data, such as layouts 40 or protocols 50, liquid compound fluid types 92, and patterns 47 (along with sites 32 for the patterns 47) generated using the CRM 29 disclosed herein. In an example, the data storage device 28 saves the protocols 50 and layouts 40 in the form of a database 25 separately for easy retrieval when the CRM 29 is accessed by a user. The data storage device 28 may include various types of memory modules, including volatile and nonvolatile memory. As an example, the data storage device 28 may include Random Access Memory (RAM), Read Only Memory (ROM), and Hard Disk Drive (HDD) memory. Other types of memory may also be used. In some instances, different types of memory in the data storage device 28 may be used for different data storage needs. For example, the processor 26 may boot from Read Only Memory (ROM), maintain nonvolatile storage in the Hard Disk Drive (HDD) memory, and execute program code stored in Random Access Memory (RAM). Generally, the data storage device 28 may be a non-transitory, tangible computer readable storage medium or memory. For example, the data storage device 28 may be an electronic, magnetic, optical, electromagnetic, infrared, or semiconductor system, apparatus, or device, or any suitable combination thereof. More specific examples of the computer readable storage medium or memory may include, for example, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination thereof.

The processor 26, in conjunction with addressing circuitry 31, operatively and individually controls each dispenser 12, 12' such that a predetermined volume of a fluid/substance may be dispensed into or onto multiple aligned sites 32 on the plate surface 34. If a reservoir is fluidly connected to deliver fluid to a fluid channel 16 associated with the dispenser 12, 12', Note that the processor 26, in conjunction with the addressing circuitry 31, also controls the amount of fluid/substance that is delivered from the reservoir to the fluid channel 16. In many examples however, the fluid channels 16 may be manually fillable via a user of the system 10.

The addressing circuitry 31 may include electrical interconnect members, conductive traces, bond pads, electrical pins, and/or the like. The addressing circuitry 31 operatively connects, for example, the actuators 22 to the processor 26 such that the processor 26 controls the electronics throughout the patterned layer dispensing system 10. The addressing circuitry 31 may, in some instances, be housed in an electrical housing 33 (FIG. 1), and/or integrated into the die 14 (FIG. 2), and/or formed directly on a surface of the cassette 23 (FIG. 3). The patterned layer dispensing system 10 shown in FIG. 1 may also include the plate surface 34. As mentioned above, the plate surface 34 may be any media or non-media substrate having discrete sites 32 (e.g., cavities) for receiving substances. FIG. 1 also shows a transport stage 35 that supports the plate surface 34 and may be used for plate surface 34/dispenser 12, 12' positioning. Note that the system 10 includes controls 27 that are utilized to position the plate surface 34 and/or conjoined dispensers 12, 12' for each step of a three-dimensional addressing scheme for placing fluids on the plate surface 34 including X and Y plate surface 34 dimensions and a Z dimension orthogonal to the plate surface 34 to allow for building the layers of 3D structures. In some examples, the addressing scheme may be two-dimension in the X and Y axis only, such as when doing pharmaceutical experiments.

In any of the examples disclosed herein, the dispensers 12, 12' may be arranged in a two-dimensional array including any number of dispensers 12, 12' in any number of rows and any number of dispensers 12, 12' in any number of columns. As an example, an array of dispensers 12, 12' may be a 9×12 array. A two-dimensional array of dispensers 12, 12' may be used to dispense substance(s) in discrete positions of rows and/or columns of a plate surface 34 simultaneously or near-simultaneously.

Prior to implementing and using the patterned layer dispensing system 10, a desired protocol 50 with a set of fluid types 92 and a set ordered layers 54 with patterned aligned sites 32 may be created using the control interface 24 and user interface 30 or by using another computing device (not shown) that is operatively connected to the processor 26, which executes the computer readable instructions of the CRM 29 disclosed herein. The computing device may be any device that is capable of being wired or wirelessly connected to the processor 26, including, for example, desktop computers, laptop computers, cell/smart phones, personal digital assistants (PDAs), or the like. Accordingly, a computing device provides an interface, such as a graphical user interface (GUI) or other for a user to interact with and utilize the CRM 29 to create, for example, at least one protocol 50 corresponding a set of ordered layers 54 with layouts 40 of patterned aligned sites 32.

Figure 4A:
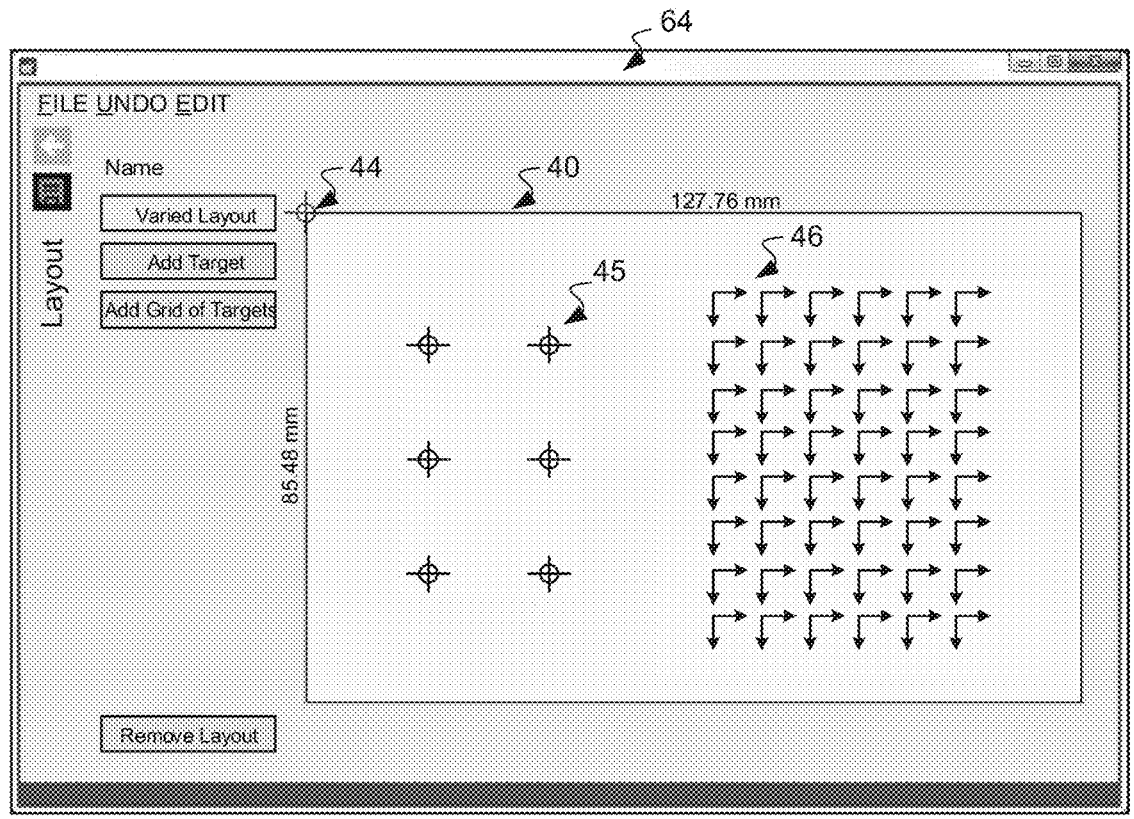
FIG. 4A is a screen shot of an example layout editor.

Examples of layouts 40 that may be generated using the CRM 29 and used in various protocols 50 are described in reference to FIGS. 4A-4F and 5-7. For instance, FIG. 4A is a screen shot of an example layout editor 64 for one example user interface 30 to add, modify, or delete layouts 40. Layout 40 includes length dimensions in the horizontal and vertical directions and a layout calibration origin 44 of the plate, which may be a corner origin aligned to dispensers 12, 12'. In this example, one can select from pre-existing layouts 40 (see FIG. 4B) or create new ones and edit them by adding alignment targets such as center origin 45 and corner origins 46 individually or in a grid. The alignment targets are referenced to the plate origin 44.

Figure 4B:
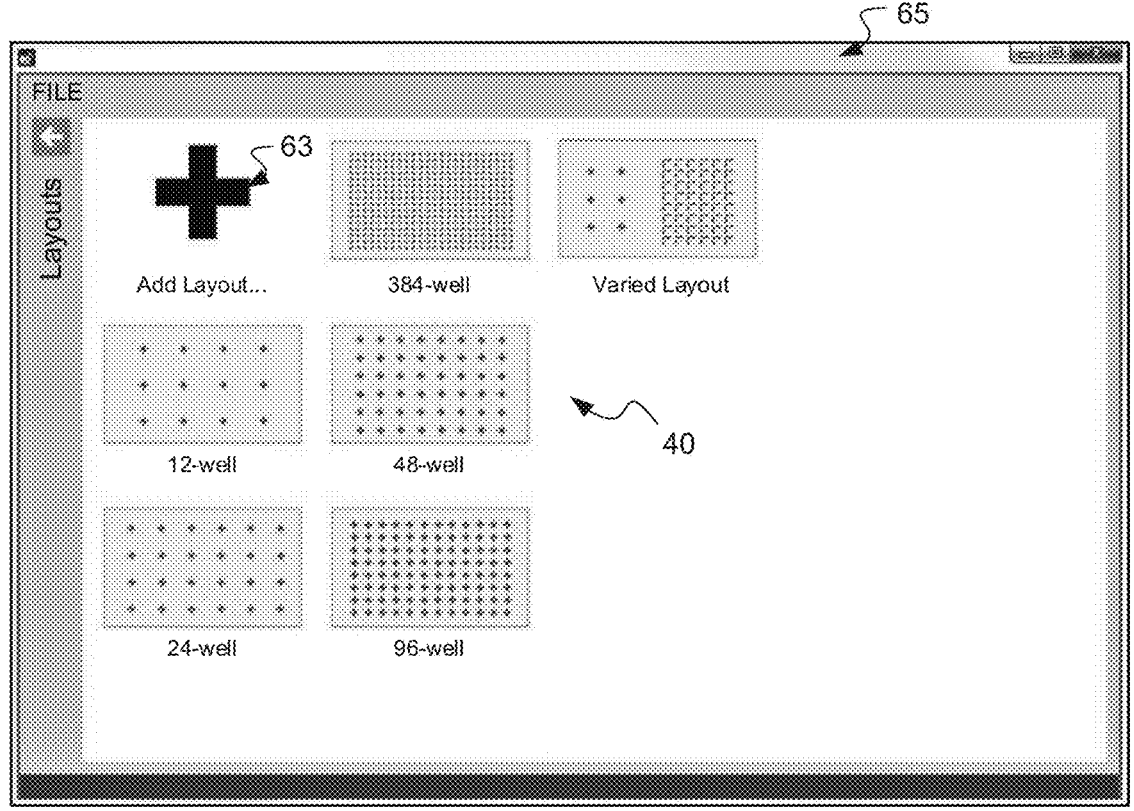
FIG. 4B is a screen shot of an example layout selection interface.

FIG. 4B is a screen shot of an example layout selection interface 65 showing the various possible layouts 40 available, including the varied layout of FIG. 4A. A new layout 40 can be created as with the layout editor 64 in FIG. 4A by selecting the "add layout" icon 63.

Figure 4C:
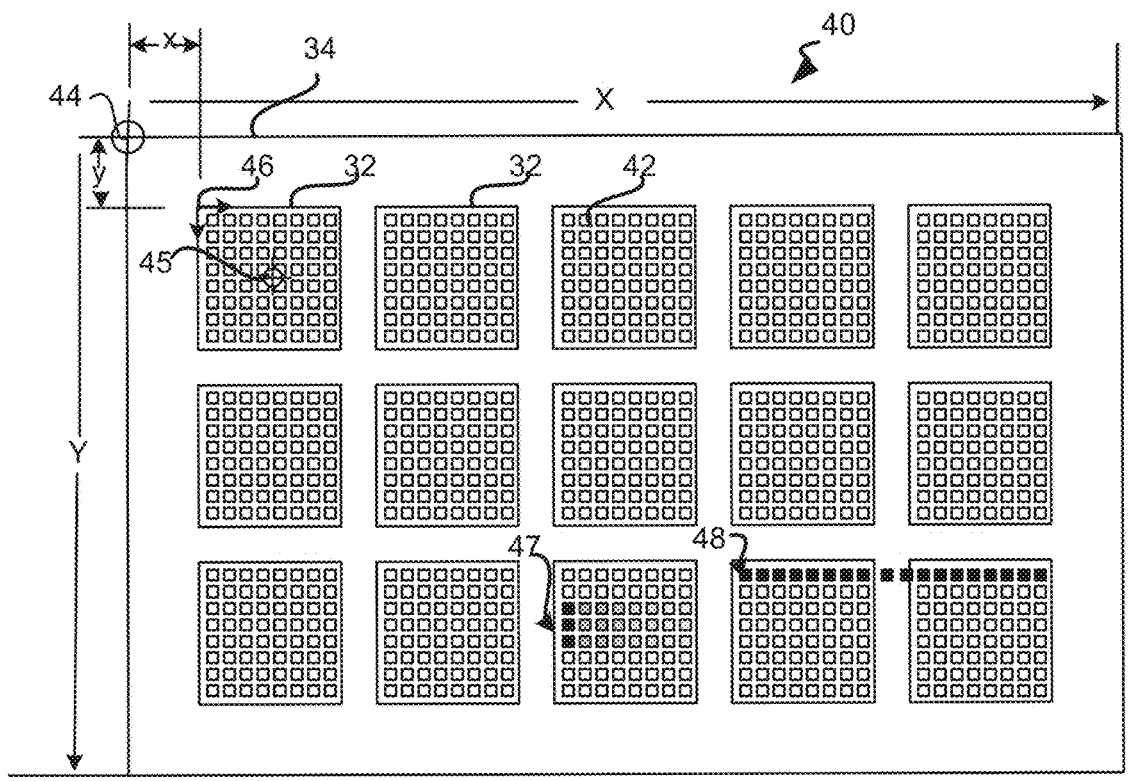
FIG. 4C is an example layout.

FIG. 4C is a layout 40 that in this example has an array of sites 32 spanning three rows along axis Y and five columns along axis X. Each site 32 has a center origin 45 and a corner origin 46, either of which may be used to locate the site 32 in an "x" and "y" distance from the plate origin 44, which may be a calibrated origin to the fluid dispensers 12, 12'. By aligning each site 32, either by its center origin 45 or its corner origin 46, a precise location of spots 42 can be used to dispense liquids accurately for a site 32 to create pattern 47 (an example gradient bar pattern). The spots 42 are arranged as a binary bit-map or grid of spots 42 within the site. While the example shown demonstrates a rectangular grid, other shapes and geometries for the layout of the spots within and/or outside of site 32 are possible. For instance, the binary bit-map of spots 42 can include the space within the horizontal and/or vertical spacing between sites to allow all locations on the plate surface 34 to be accessed or even overlap spots in other sites such as illustrated by example overlapping pattern 48, such as may be used to indicate pairs of experiments. For example, if the plate surface 34 is a well plate surface, one layer 54 could have an ink liquid composition and the area of the well plate outside of the well can also be labeled with the ink. The layout 40 may be used in multiple layers 54 and can be stored and accessed separately in a database 25 from the layers 54 and the protocols 50. For instance, a layout 40 may be edited in the user interface 30 and its use with various layers 54 and protocols 50 automatically updated.

Figure 4D:
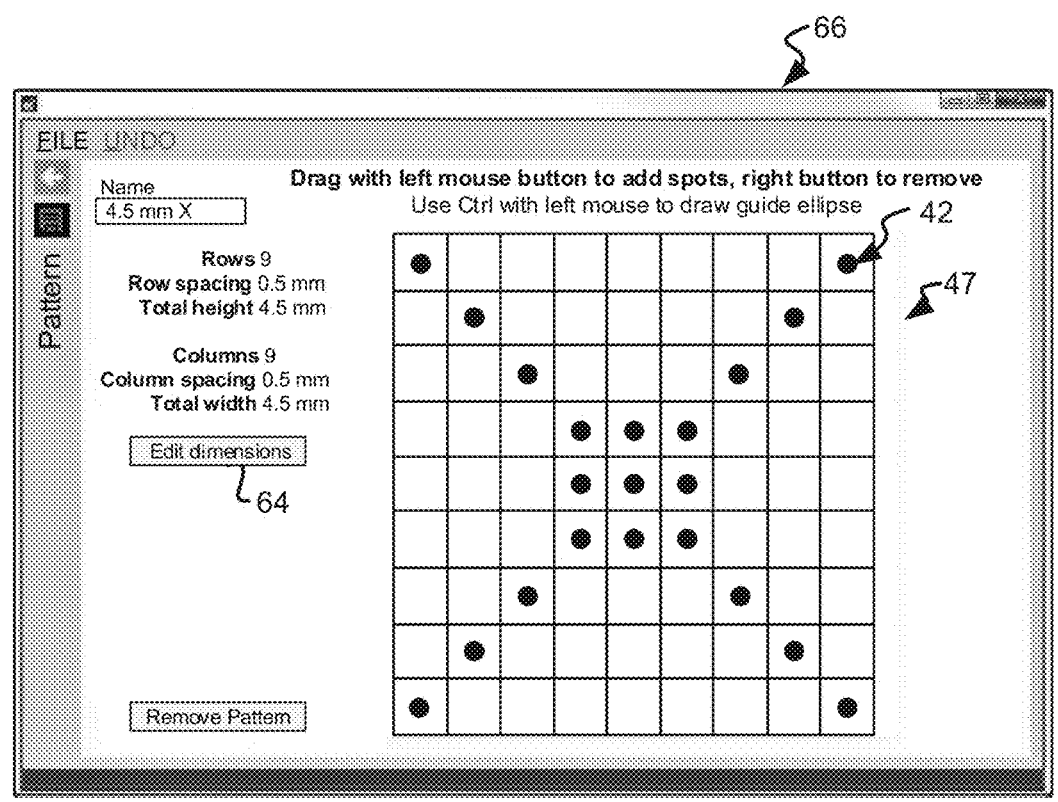
FIG. 4D is a screen shot of an example bit-map pattern editor.

FIG. 4D is a screen shot of an example bit-map pattern editor 66 for pattern 47. A user may select the "edit dimensions" GUI button 64 to change the number of rows and columns in the bit-map as well as to set the row and column spacing and the height and width of the spots 42. In addition, the particular bit-map pattern 47 being edited may be named and stored separately in a database 25 to be used with multiple layers 54 and/or at least one protocol 50.

Figure 4E:
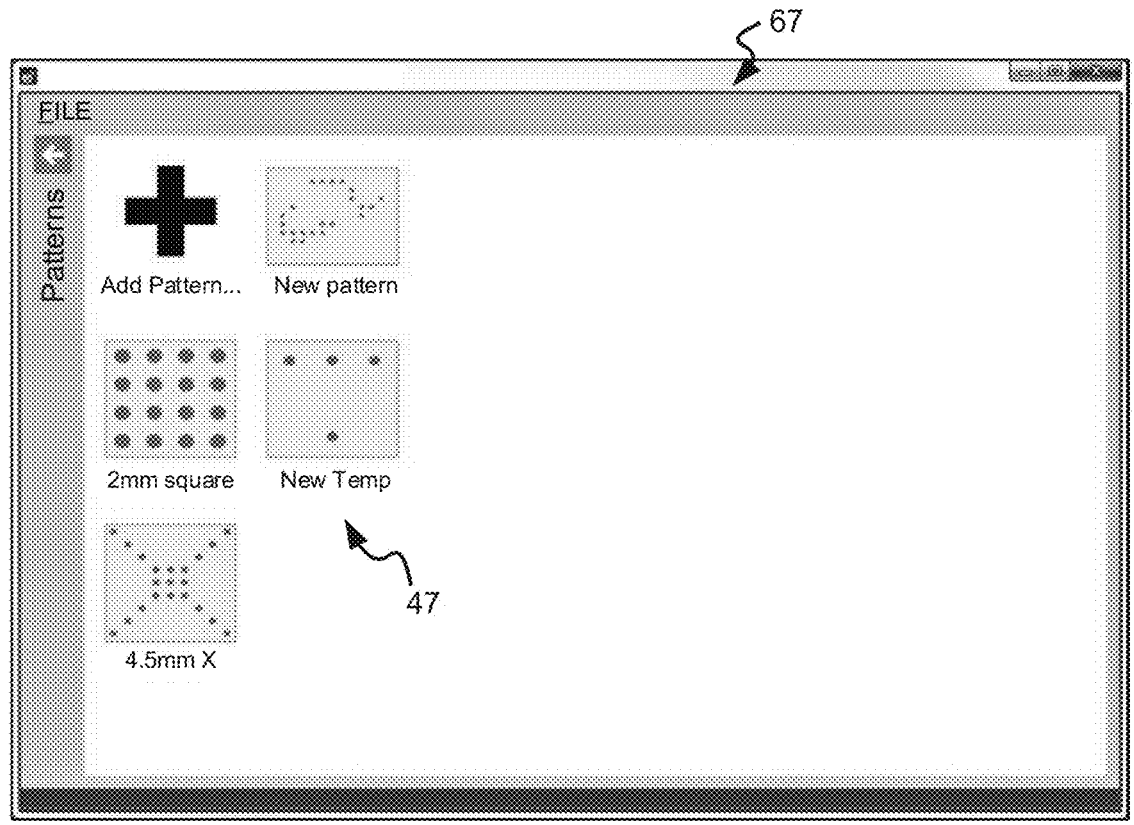
FIG. 4E is a screen shot of an example select pattern screen.

FIG. 4E is a screen shot of an example select pattern screen 67 which allows a user to choose an existing pattern 47 from the database 25 or to add new ones by selecting the "add pattern" icon.

Figure 4F:
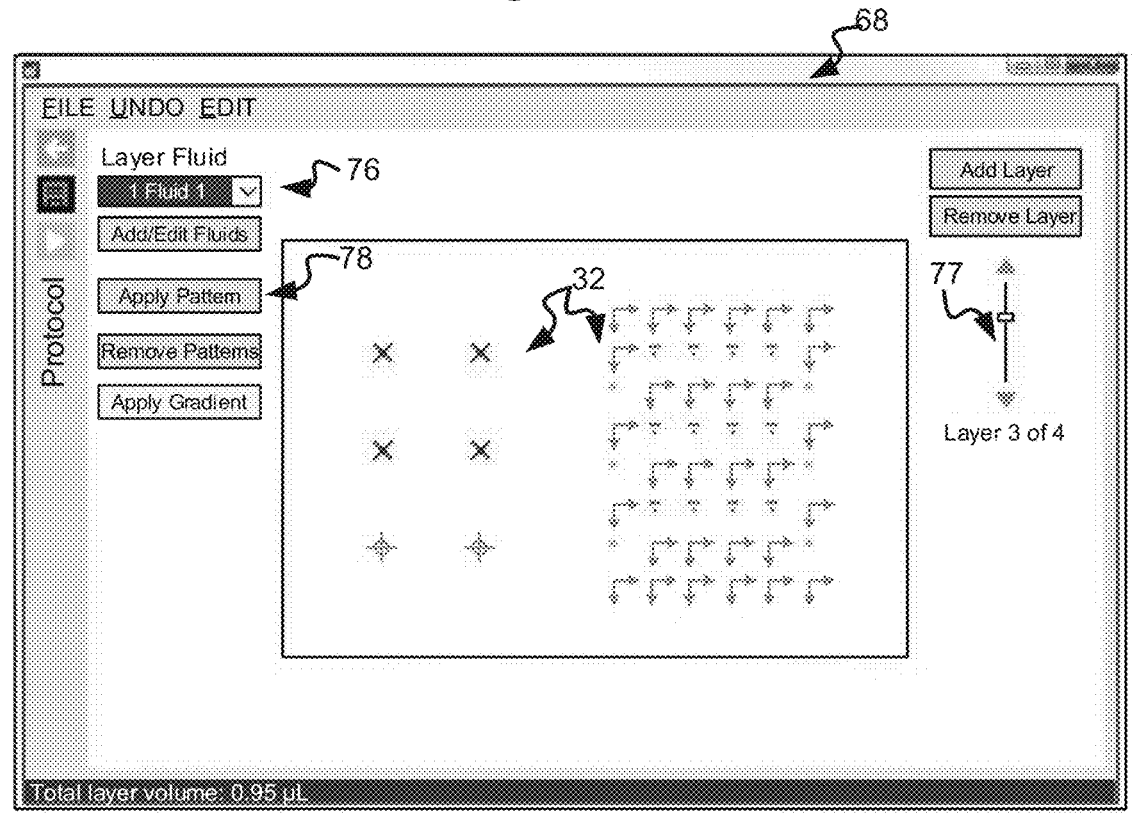
FIG. 4F is a screen shot of an example protocol editor.

FIG. 4F is a screen shot of an example protocol editor 68. As noted previously, a protocol 50 is a collection of layers 54 and in the editor a layer 54 can be selected using a slide interface 77. Layers 54 may be added and removed from the database 25 as desired. Once a layer 54 is chosen, the user can select which of the available fluid types 92 is to be used with the chosen layer 54 from fluid pull down menu 76. A user can also add or edit fluids to the database 25. A user, once having chosen a particular layer 54, may select various sites 32 and apply a pattern 47 using the "apply pattern" button 78.

Figure 4G:
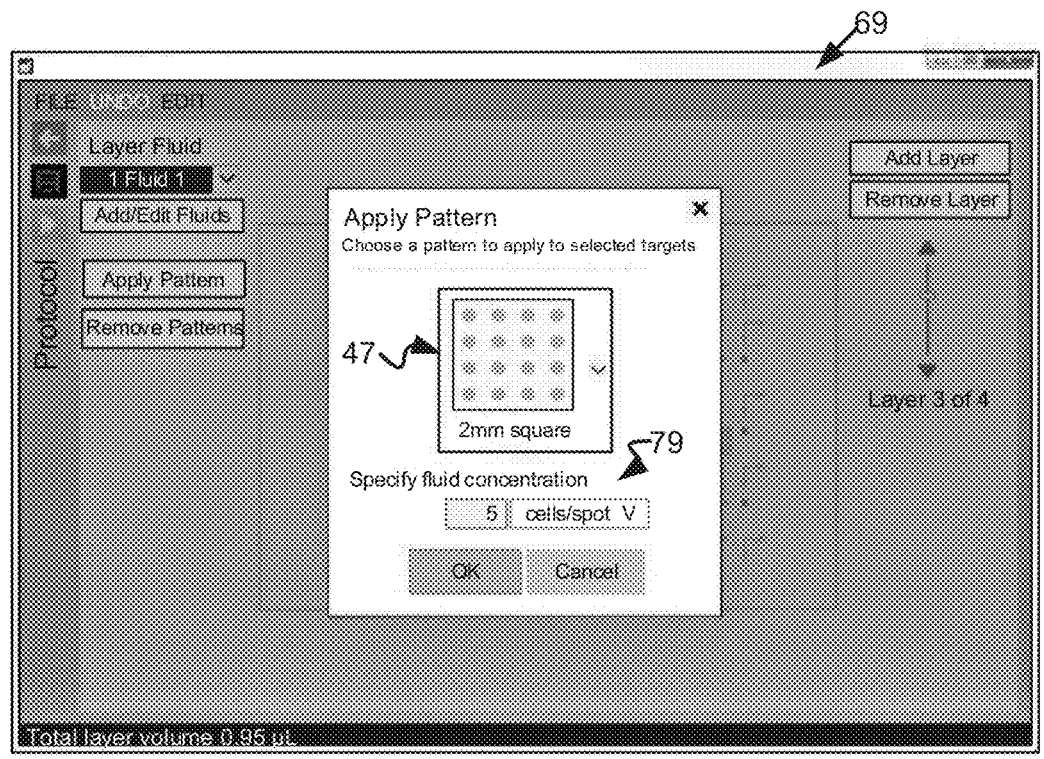
FIG. 4G is a screen shot of an example select pattern interface.

FIG. 4G is a screen shot of an example select pattern interface 69. In this GUI interface, a user may select from a pulldown of pictorial icons of the various patterns 47 in the database 25, the one to apply to the previously chosen layer 54. Further, a user may specify a desired fluid concentration using the pull down menu 79, which if a gradient has been selected may include beginning and ending fluid density concentrations.

Figure 5:
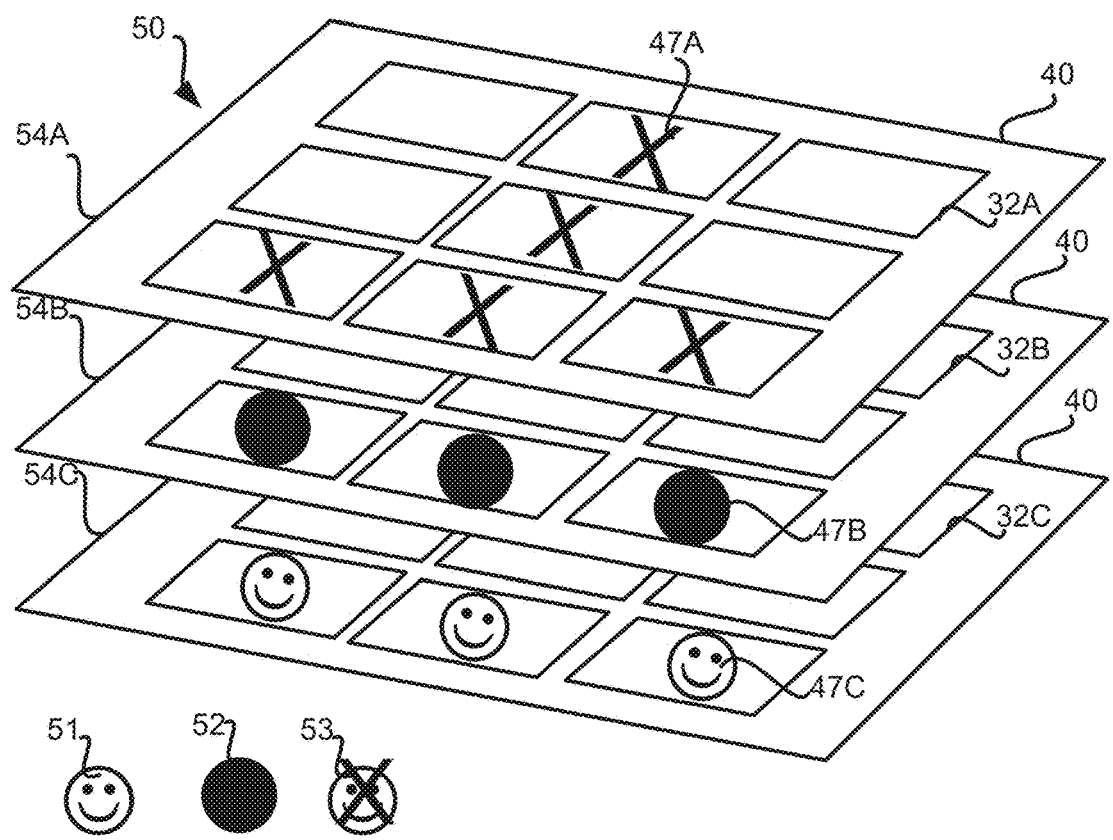
FIG. 5 is an example protocol of a set of layers sharing a common layout of sites.

FIG. 5 is an example protocol 50 of a set of layers 54A, 54B, and 54C sharing a common layout 40 of sites 32A, 32B, and 32C, respectively, of three rows and three columns. Each of sites 32A-C may include a pattern 47 based on the respective layer 54A-C. For instance, layout 40A has an "X" pattern 47A in some sites 32A, layout 40B has a large consistent circular pattern 47B in some sites 32B, and layout 40C has a "smiley face" pattern 47C in some sites 32C. Each of the different layers 54A-C may be defined to include a particular fluid compound type to be dispersed in a respectively defined pattern 47 at chosen sites on the respective layer. The layers 54A-C may be deposited in one example in a strict order from bottom to top, such as depositing layer 54C first, then layer 54B, and then layer 54A. In other examples, the ordering of the layers may be randomized, shuffled, or otherwise distributed to increase experimentation results. Further, the layers 54A-C are all dimensionally arranged with each other so that the aligned patterns 47 are in precise alignment.

FIG. 5 also shows some example possible outcomes of experiments encompassing a run of protocol 50 onto a set of sample compounds in a well microplate. In this example, the layout 40 reflects the location of the wells in the microplate, such as a three row by three column set of wells. For instance, first result 51 shows just a smiley face. This result may occur if the desired liquid compound deposited for layer 54C reacted as expected with a sample compound in a well in a microplate and the liquid compounds in layers 54B and 54A did not react with the sample compound. The second result 52 may occur if the liquid compound deposited for layer 54B reacts with a sample compound whether or not the liquid compounds dispersed for layers 54A and 54C reacted with the sample compound. Third result 53 may occur if the liquid compounds for the first layer 54A and third layer 54C react with a sample compound but not the liquid compound of layer 54B. The sample compounds within each of the wells of the microplate may contain different substances and any visual results indicated may be based on the patterned layer deposition. In fact, depending on the protocol 50, layers may interact and a very recognizable visual response may be generated to allow for a quick review and analysis of test results.

Figure 6:
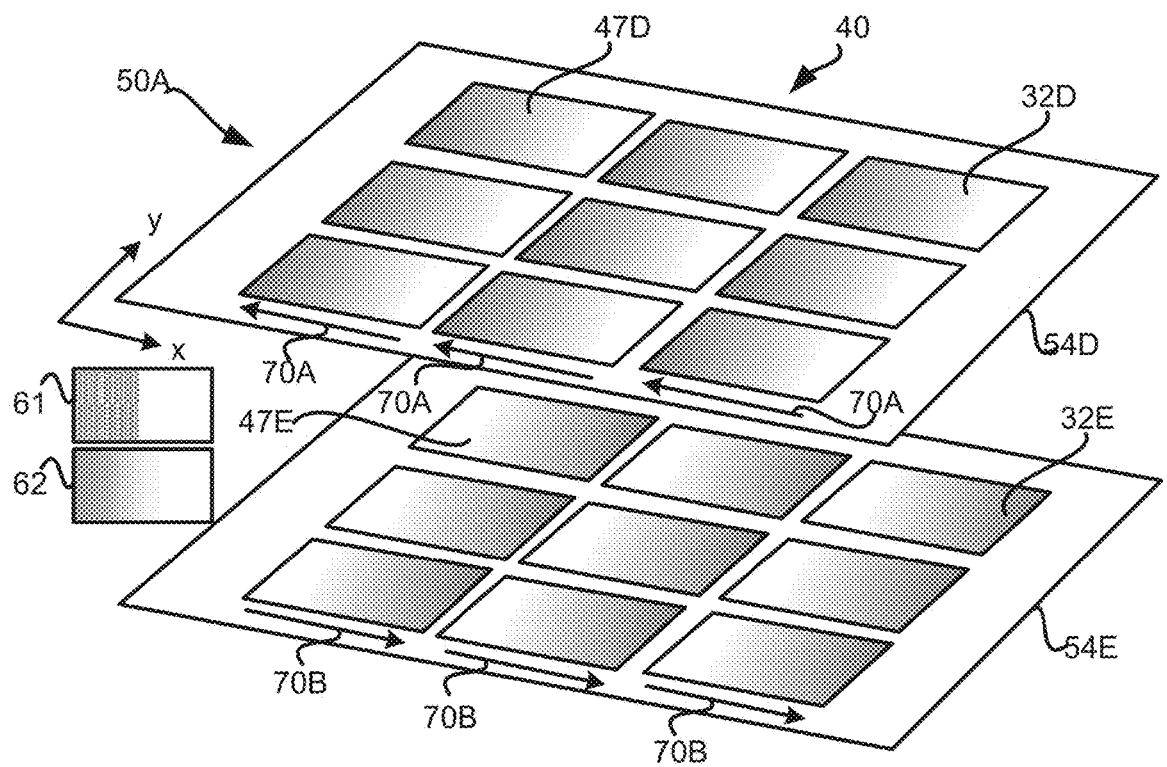
FIG. 6 is an example cell gradient protocol.

FIG. 6 is an example cell gradient protocol 50A wherein the protocol 50A specifies two layers 54D and 54E. Each of the layers 54E and 54F share the same layout 40 to ensure alignment of sites 32D and 32E. Sites 32D of layer 54D has a first gradient pattern 47D that increases the X fluid density 70 in the reverse "X" direction for the fluid compound deposited for layer 54D. The Y fluid density 71 for the "Y" direction is held constant in this example for pattern 47D.

Sites 32E of layer 54E has a second gradient pattern 47E that increases the fluid density 70B in the forward "X" direction for the fluid compound deposited for layer 54E. Accordingly, layers 54D and 54E have counter opposing gradient fluid densities and when aligned and deposited on top of each other, a visual indication may occur where the two liquid compounds deposited for layers 54D-E. For instance, first gradient result 61 may occur when there is a sharp transition due to the interaction of the various fluid densities of the liquid compounds deposited in layers 54D and 54E. Second gradient result 62 may occur when there is a smooth transition due to the interaction of the fluids.

Figure 7:
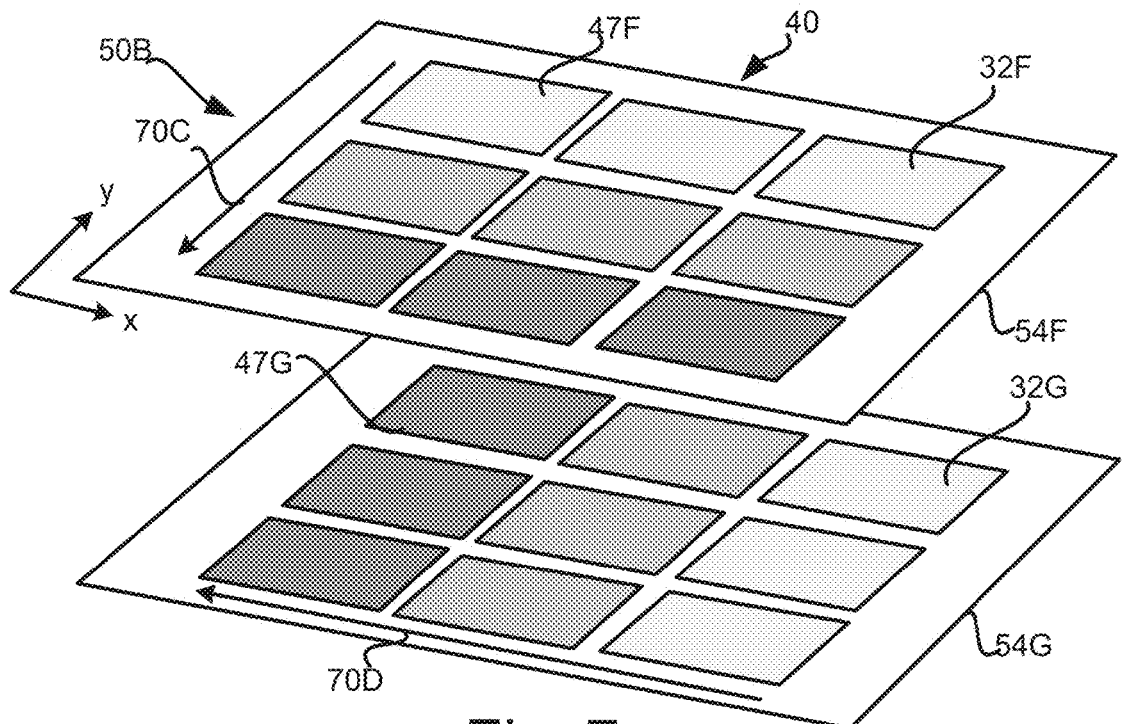
FIG. 7 is an example plate gradient protocol.

FIG. 7 is an example plate gradient protocol 50B wherein the gradient protocol 50B specifies two layers 54F and 54G. Each of the layers 54F and 54G share the same layout 40 to ensure alignment of sites 32F and 32G. Layer 54F has a first plate gradient fluid density 72 that varies for each site 32F in the reverse "Y" direction. That is each site 32F has a fixed fluid density, however there is an increasing fluid density in sites 32F depending on how close they are to the origin of the "Y" axis. The sites 32F have the same fluid density in the "X" axis direction for a given "Y" axis location. Layer 54G is similar to layer 54F but has a second plate gradient fluid density 73 occurring in the reverse "X" direction and a constant fluid density in the "Y" direction other than that fluid density determined by the "X" location of the site 32G. The patterns 47F and 47G for layers 54F and 54G, respectively, are uniform other than that the amount of fluid to be deposited is based on the sites 32F and 32G plate location. Accordingly, in this example, the gradient fluid density varies from site to site rather than within the site as explained for FIG. 5.

Figure 8:
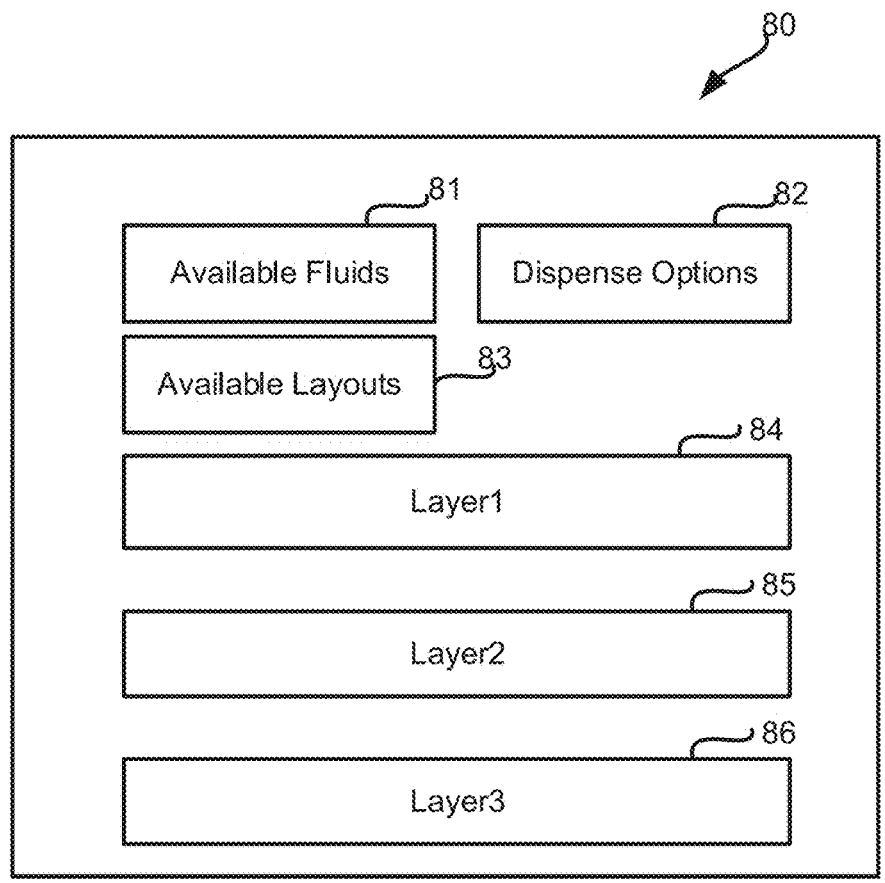
FIG. 8 is an example of protocol options.

FIG. 8 is an example of protocol options 80. Various protocols 50 may be created in the user interface 30 from available options stored in a database 25. A protocol 50 is a collection of layers, such as layer1 84, layer2 85, and layer3 86. For each layer there may be various options selected. For instance, the patterned layer dispensing system 10 (FIG. 1) may have several available fluids 81 to choose from although each layer may have only one fluid. In addition, new available fluids 81 may be added to the options as they become available. A protocol 50 may also have at least one fluid dispense option 82, such as the amount of fluid per drop, the number of drops per spot, and the delay between depositions of the fluids as just some examples. Additionally, a user may also choose at least one available layout 40 from a set of available layouts 83 that can be created and stored in the database 25.

Figure 9:
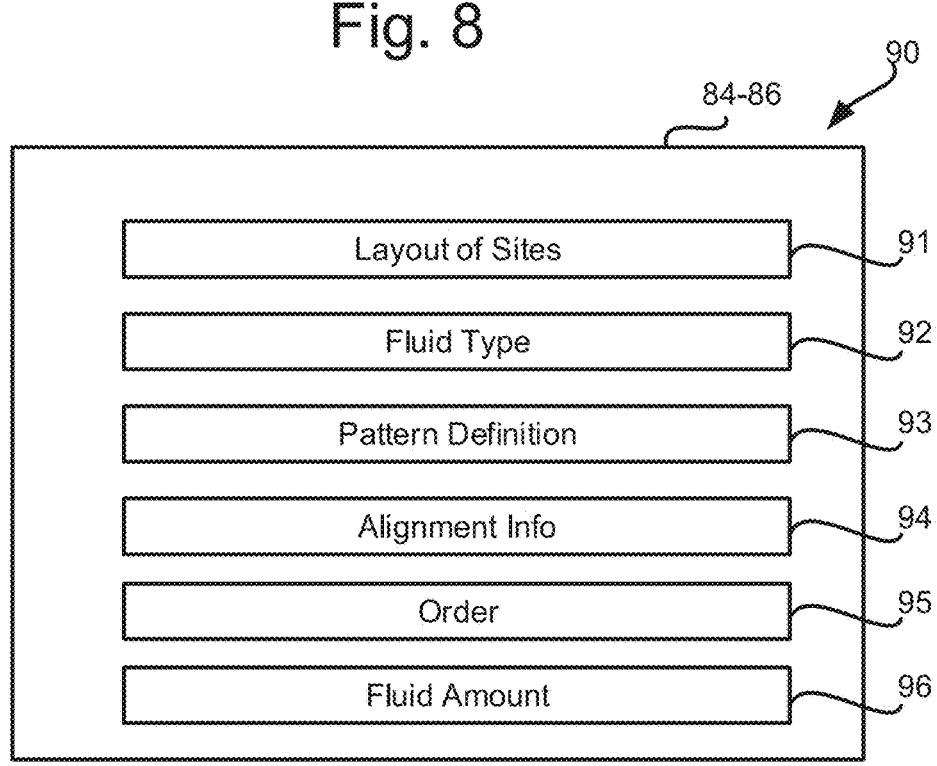
FIG. 9 is an example of layer options.

FIG. 9 is an example of layer options 90 for layers 84-86 of FIG. 8. Various options include selecting the layout 40 of sites 91, the fluid type 92, and a fluid amount 96 for each spot in a pattern definition 93 used for the layer, and alignment information 94 for the patterns 47. That is, each pattern 47 may be aligned in from its center origin 45 or a corner 46 to the layout or plate origin 44 (see FIG. 4). Each layer 84-86 includes an "order" 95 or indication of where it is to be located in the order of deposition of the layers. That is, it may be the first layer, the last layer, or a layer in-between. In some examples, a wildcard option may be chosen for the order 95 to allow for randomization of the deposition of layers or calculated reordering to further increase experimental results. For instance, the order of the deposition of fluids may affect how chemical or biologic processes interact and it may be beneficial to know if there is a specific set of ordering that helps or hurts the outcome. Accordingly, the specific order of layers may be specified by the user or it may be chosen programmatically by the patterned layer dispensing system 10.

Figure 10A:
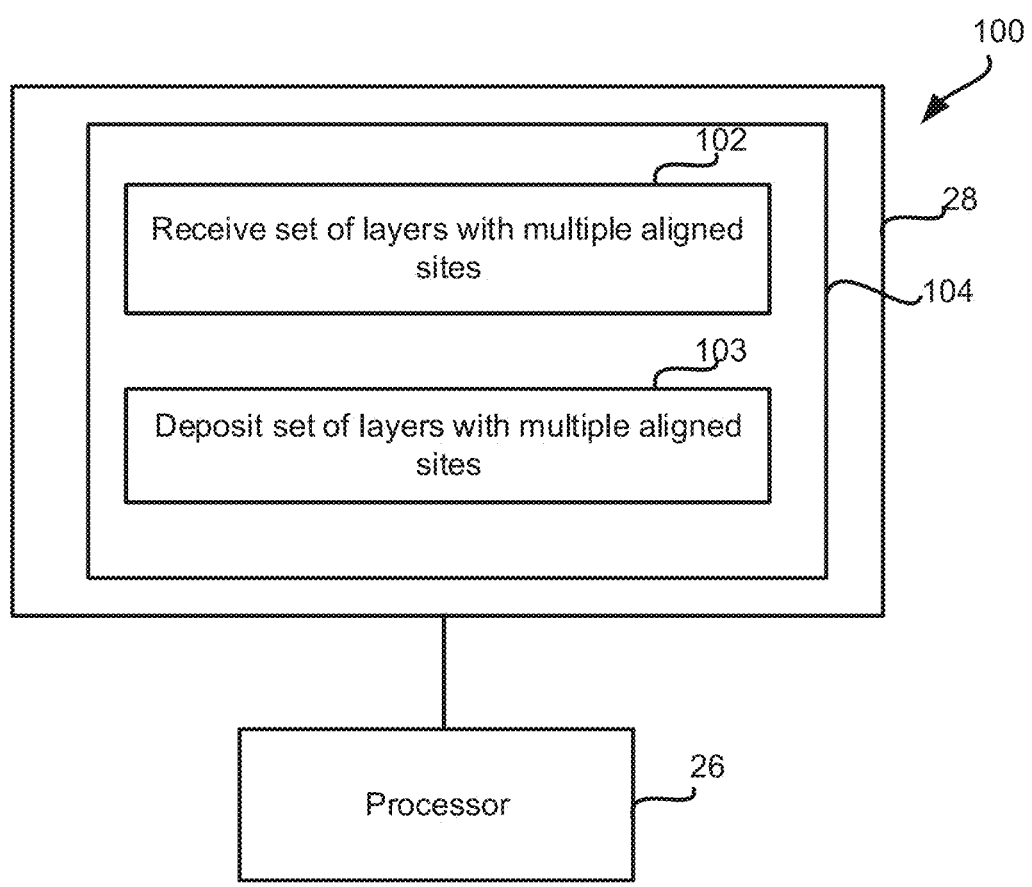
FIG. 10A is an example block diagram of a computer implemented patterned layer dispensing system.

FIG. 10A is an example block diagram 100 of a computer implemented patterned layer dispensing system 10 with a plurality of fluidic dispensers 12, 12' each containing a fluid type 92. A processor 26 is coupled to a computer readable medium 29 containing instructions 104 and is further coupled to a control interface 24 that is further coupled the plurality of fluidic dispensers 12, 12'. The instructions 104 cause the processor 26 to deposit the fluid types 92 by a protocol 50 in a set of layers 54 in a specific order to a plate surface 34 having a plate origin 44 and a first group of sites 32 in a geometric layout, each layer 54 includes an order, a fluid type 92 and amount, and a layout 40 of a second group of sites 32 with a pattern of spots 42, aligned to the plate origin 44, where the fluid type 92 and amount is deposited. At least one layer 54 in the set of layers includes a layout 40 with the second group of sites 32 defining the geometric layout of the first group of sites 32.

FIG. 10A is an example block diagram 100 of a computer implemented patterned layer dispensing system 10 to create multi-layers of materials. A processor 26 is coupled to a storage device 28. The storage device 28 includes instructions 104 that when read and executed by the processor 26 cause the processor 26 to create multiple patterned layers 54 of material. The instructions 104 may include editor instructions 102 for receiving a set of layers. Receiving the set of layers may include creating a set of layers 54 using a graphical user interface. Each layer 54 includes an order 95 and specifies a fluid type 92, a layout 40 of a group of sites 32, a respective pattern 47 of spots for each site 32 where the fluid type 92 is to be deposited with deposition instructions 103 including an alignment of the respective pattern 47 within each site 32, and a fluid amount 96 for each spot in each respective pattern 47 of spots, wherein the fluid amount 96 for each spot varies in a gradient fluid density 70-74 across at least one of the respective pattern 47 and a location of the site 32 of the respective pattern 47 within the layout 40. The instructions 104 may also include a set of fluid types 92 specified in the set of layers 54 that are deposited to a plate surface 34 in a specific order.

In another example, a non-transitory computer readable medium 29 includes instructions 104 which when read by a processor 26 cause the processor 26 to execute operations to create a set of patterned layers 54 using a user interface 30. The instructions 104 also allow the processor 26 to apply by deposition according to a protocol 50 a set of fluid types 92 specified in the set of patterned layers 54 in a specific order to a plate surface 34 having a geometric layout of a first group of sites 32. Each patterned layer 54 includes an order, a fluid type 92 and amount, a layout 40 of a second group of sites 32 with a pattern of spots 42, aligned to a plate origin 44 of the plate surface 34, where the fluid type 92 is to be deposited. At least one layer 54 in the set of patterned layers includes a layout 40 with the second group of sites 32 defining the geometric layout of the first group of sites 32.

Figure 10B:
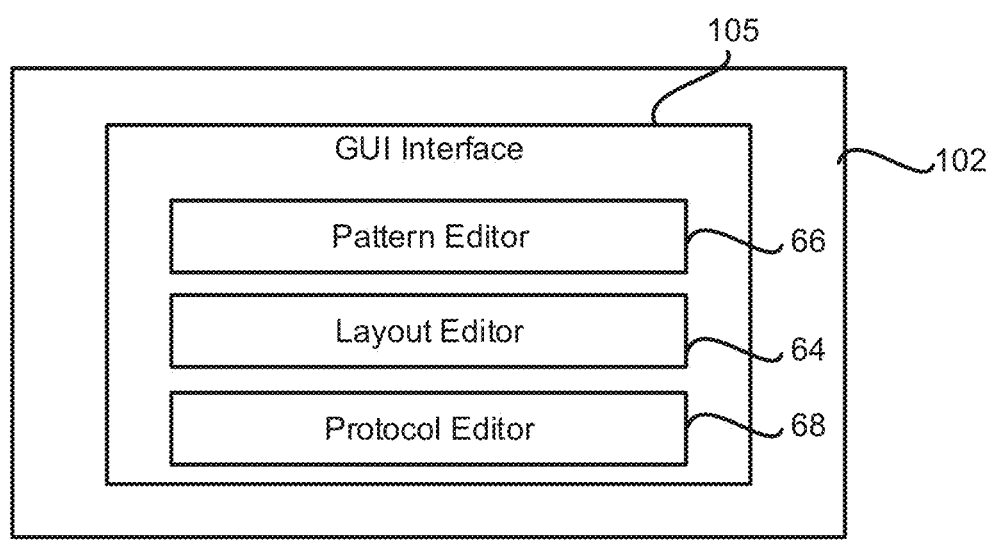
FIG. 10B is a block diagram of example edit instructions.

FIG. 10B is a block diagram of example edit instructions 102 for operating a GUI interface 105 as user interface 30 to create and receive a protocol 50 of a set of patterned layers 54 with layouts 40 of multiple aligned sites 32. The GUI interface may include instructions 104 for a pattern editor 66, a layout editor 64, and/or a protocol editor 69. The GUI interface 105 may be used to create a set of layers 102 in the protocol editor 69. The protocol editor 69 allows for selecting multiple layers 54, and for each layer 54 selected allowing the selected layer 54 to select a layout 40 of a group of sites 32. Further for the selected layer 54, a pattern 47 may be selected to be placed and aligned at each site 32 location in the layout 40. The pattern editor 66 allows a user to visually interact with the GUI interface 105 and create, delete, edit or otherwise modify patterns 47. The layout editor 64 allows for the placement of aligned site 32 locations within a particular layout 40 to align the sites and correspondingly the patterns 47 with a plate origin 44 (which may also be calibrated to the dispensers 12, 12') with respect to either a center origin 45 or a corner origin 46 of patterns 47.

Figure 10C:
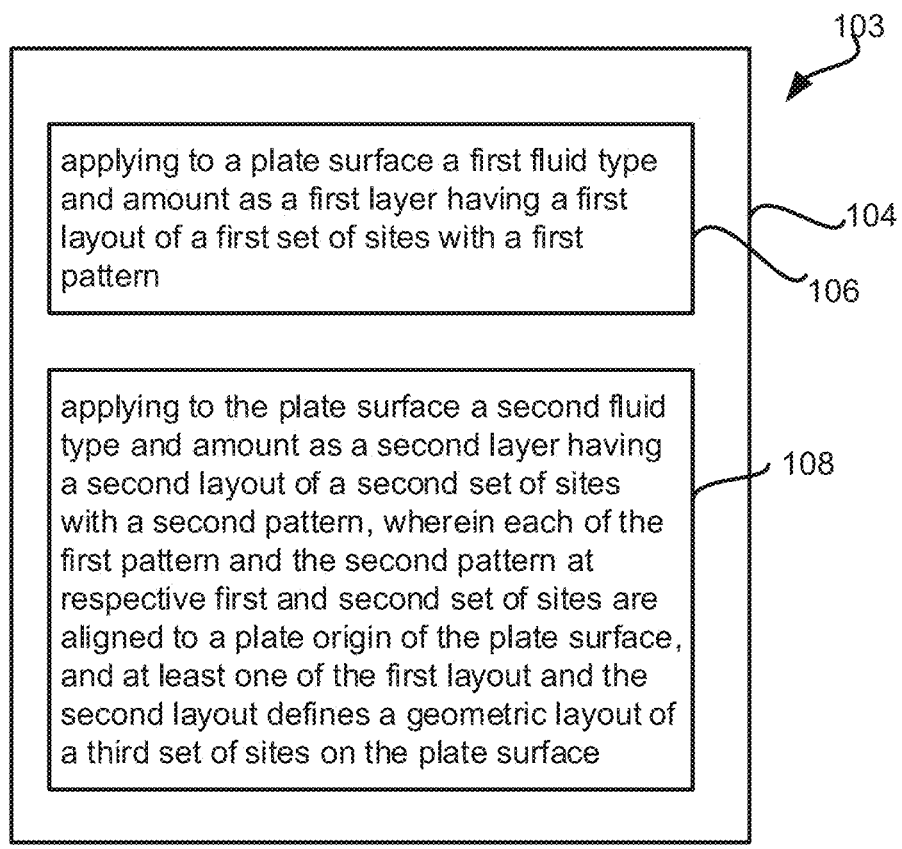
FIG. 10C is a block diagram of example deposition instructions to implement a method of patterned layer deposition.

FIG. 10C is a block diagram off example deposition instructions 103 for implement a method of patterned layer deposition by fluid dispensers 12, 12' controlled by a processor 26 coupled to computer readable memory 29, comprising instructions 104 that when executed by the processor 26 cause the processor 29 to perform operations. The operations include the step in block 106 of applying to a plate surface 34 a first fluid type 92 and amount as a first layer 54 having a first layout 40 of a first set of sites 32 with a first pattern 47. The operations also include the step in block 108 of applying to the plate surface 34 a second fluid type 92 and amount as a second layer 54 having a second layout 40 of a second set of sites 32 with a second pattern 47, wherein each of the first pattern 47 and the second pattern 47 at respective first and second set of sites 32 are aligned to a plate origin 44 of the plate surface 34, and at least one of the first and second layout 40 defines a geometric layout of a third set of sites 32 on the plate surface 34.

In some examples, a gradient fluid density may vary across a site 32 in the first set of sites. In other examples, the gradient fluid density may vary across the plate surface 34 but is constant within each site 32 within the first set of sites. In some instances, the plate surface 34 may be a well microplate and at least one of the first layout 40 and the second layout 40 defines a geometry of the well microplate.

In addition, the created multiple patterned and aligned layers of material may be used for experimental results or form a commercial product. For instance, the plate surface 34 may be a paper medium and the various layers may include pharmaceutical fluid types that when deposited are separated by distance or on top of each other due to the use of different patterns 47. Further, one layer 54 may include a marking fluid type, such as ink, to mark the expiration date, the product name, or other information on the product. When the product is digested, the pharmaceutical fluid types deposited on the plate surface 34 may intermix in the stomach and perform their intended function. Also, a 3D-type product may be made by use of several layers 54 and choices of fluid types, such as to make a scaffolding structure with a fluid having metallic, plastic, or epoxy materials, and then depositing a chemical or biologic material on the scaffolding structure to create 3D organs, skin grafts, and the like.

In summary, depositing layouts 40 of precision aligned patterns 47 in multiple layers 54 according to a protocol 50 allows for a simple yet flexible way to define non-trivial geometries for complex pattern application in experimental testing and fabrication of 3D structures. Layouts 40 of the layers 54 allow for creation of custom dispense surfaces, but layouts 40 may also be created to match common pre-existing surfaces or scaffold structures.

While the claimed subject matter has been particularly shown and described with reference to the foregoing examples, those skilled in the art will understand that many variations may be made therein without departing from the intended concept and scope of subject matter in the following claims. This description shall be understood to include all novel and non-obvious combinations of elements described herein, and claims may be presented in this or a later application to any novel and non-obvious combination of these elements. The foregoing examples are illustrative, and no single feature or element is essential to all possible combinations that may be claimed in this or a later application. Where the claims recite "a" or "a first" element of the equivalent thereof, such claims shall be understood to also include incorporation of multiple such elements, neither requiring nor excluding two or more such elements.

What is claimed is:

1. A system for patterned layer deposition, comprising:
a plurality of fluidic dispensers each containing a fluid type; and
a processor coupled to a control interface coupling the plurality of fluidic dispensers,
wherein the processor is to deposit the fluid types by a protocol in a set of layers in a specific order to a plate surface having a plate origin and a first group of sites in a geometric layout, each layer comprising:
an order;
a fluid type and amount, and
a layout of a second group of sites with a pattern of spots, aligned to the plate origin, where the fluid type and amount are deposited, and
wherein at least one layer in the set of layers includes a layout with the second group of sites defining the geometric layout of the first group of sites;
wherein the protocol includes a set of layers which interact to create a visual response.

2. The system of claim 1 wherein each pattern of spots are aligned with respect to one of a center and a corner of the respective pattern of spots in a respective site to the plate origin of the plate surface.

3. The system of claim 1 wherein at least one pattern of spots overlaps at least one other pattern of spots at another site.

4. The system of claim 1 wherein the fluid amount in at least one layer varies in a gradient fluid density across the pattern of spots or a location of the site of the pattern of spots within the layout.

5. The system of claim 1 wherein the user interface comprises an editor to receive user input to edit a parameters of any layer of the set of layers or the geometric layout of the first group of sites.

6. The system of claim 1 wherein the plate surface is a well microplate and one of the set of layers defines a geometry of the first group of sites defining wells in the well microplate.

7. The system of claim 1 wherein the processor is programmed to receive user input to edit a layer of the set of layers or the layout of the first group of sites.

8. A non-transitory computer readable medium comprising instructions which when read by a processor cause the processor to execute operations to:
create a set of patterned layers using a user interface; and
apply by deposition, according to a protocol, a set of fluid types specified in the set of patterned layers in a specific order to a plate surface having a geometric layout of a first group of sites;
wherein each patterned layer includes:
an order, and
a fluid type and amount, and
wherein the user interface comprises an editor to receive user input to edit parameters of any layer of the set of layers or the geometric layout of the first group of sites;
wherein the instructions further cause the processor to execute the operations to:
edit at least one layout using a set of targets to place the group of sites with respect to the plate origin of the plate surface;
edit a protocol that includes selecting for each of the set of pattern layers, a fluid type and amount, and the respective pattern; and
edit a shape and a dimension of at least one respective pattern.

9. The computer readable medium of claim 8 wherein for at least one patterned layer the fluid type and amount includes a gradient fluid density defined with a beginning fluid density and an end fluid density.

10. The computer readable medium of claim 8 wherein the plate surface is a well microplate and one of the set of layers defines a geometry of the first group of sites defining wells in the well microplate.

11. The computer readable medium of claim 8 wherein the user interface comprises an editor to receive user input to edit a pattern of spots for where fluid will be deposited within the layout.

12. The computer readable medium of claim 11 wherein at least one pattern of spots overlaps at least one other pattern of spots at another site.

13. The computer readable medium of claim 8 further comprising an interface for a database of different protocols or different geometric layouts that are each editable in the user interface.

14. The computer readable medium of claim 8 wherein, in response to user input any geometric layout, the instructions automatically update any layer or protocol comprising that layout.

15. A method of patterned layer deposition by fluid dispensers, comprising:
applying to a plate surface a first fluid type and amount as a first layer having a first layout of a first set of sites with a first pattern; and
applying to the plate surface a second fluid type and amount as a second layer having a second layout of a second set of sites with a second pattern,
wherein each of the first pattern and the second pattern at respective first and second set of sites are aligned to a plate origin of the plate surface, and at least one of the first layout and the second layout defines a geometric layout of a third set of sites on the plate surface;
wherein the plate surface is a well microplate and at least one of the first layout and the second layout defines a geometry of wells on the well microplate.

16. The method of claim 15, wherein the amount of at least one of the first fluid type and the second fluid type includes a gradient fluid density that varies across a site in the first set of sites.

17. The method of claim 15 wherein the amount of at least one of the first fluid type and the second fluid type includes a gradient fluid density that varies across the plate surface but is constant within each respective site in the respective first or second set of sites.

18. The method of claim 15 wherein each pattern is aligned with respect to one of a center and a corner of the pattern in a respective site to the plate origin of the plate surface.

* * * * *